US011327008B2

(12) United States Patent
Venturini et al.

(10) Patent No.: US 11,327,008 B2
(45) Date of Patent: May 10, 2022

(54) GAS MEASUREMENT SYSTEM

(71) Applicant: Mettler-Toledo GmbH, Greifensee (CH)

(72) Inventors: Francesca Venturini, Dübendorf (CH); Pär Bergström, Meilen (CH); Martin Hertel, Steinen (DE)

(73) Assignee: METTLER-TOLEDO GMBH, Greifensee (CH)

( * ) Notice: Subject to any disclaimer, the term of this patent is extended or adjusted under 35 U.S.C. 154(b) by 189 days.

(21) Appl. No.: 16/677,769

(22) Filed: Nov. 8, 2019

(65) Prior Publication Data

US 2020/0072740 A1 Mar. 5, 2020

Related U.S. Application Data

(63) Continuation of application No. PCT/EP2018/061461, filed on May 4, 2018.

(30) Foreign Application Priority Data

May 11, 2017 (EP) .................................... 17170667

(51) Int. Cl.
*G01N 21/3504* (2014.01)
*G01J 3/02* (2006.01)
(Continued)

(52) U.S. Cl.
CPC ........ *G01N 21/3504* (2013.01); *G01J 3/0208* (2013.01); *G01J 3/0229* (2013.01);
(Continued)

(58) Field of Classification Search
CPC ........ G01J 3/24; G01N 21/39; G01N 2201/06
See application file for complete search history.

(56) References Cited

U.S. PATENT DOCUMENTS 4,709,150 A * 11/1987 Burough ............ G01N 21/3504
250/338.1
6,469,303 B1 10/2002 Sun et al.
(Continued)

FOREIGN PATENT DOCUMENTS

CN   102590092 A   7/2012
CN   102621063 A   8/2012
(Continued)

OTHER PUBLICATIONS

International Search Report (PCT/ISA/210) dated Jul. 24, 2018, by the European Patent Office as the International Searching Authority for International Application No. PCT/EP2018/061461.
(Continued)

*Primary Examiner* — David P Porta
*Assistant Examiner* — Fani Booalis
(74) *Attorney, Agent, or Firm* — Buchanan Ingersoll & Rooney PC

(57) ABSTRACT

A gas measurement system as disclosed can include a coherent light source, which emits a light beam; a detector; a beam path formed between the light source) and the detector; and a gas cell arranged in the beam path such that the detector receives light transmitted through the gas cell. The gas cell can include a porous ceramic and have an optical path length which is a multiple of the actual layer thickness of the gas cell. A optical element can be arranged in the beam path between the light source and the gas cell with the light beam emitted by the light being widened and unfocussed as the light beam enters the gas cell.

20 Claims, 4 Drawing Sheets

(51) Int. Cl.
  *G01J 3/10* (2006.01)
  *G01J 3/42* (2006.01)
  *G01N 21/03* (2006.01)
  *G01N 21/39* (2006.01)

(52) U.S. Cl.
  CPC .............. *G01J 3/108* (2013.01); *G01J 3/42* (2013.01); *G01N 21/031* (2013.01); *G01N 21/39* (2013.01); *G01J 2003/421* (2013.01); *G01J 2003/423* (2013.01); *G01N 2021/0314* (2013.01); *G01N 2021/399* (2013.01); *G01N 2201/0634* (2013.01); *G01N 2201/0636* (2013.01); *G01N 2201/0638* (2013.01)

(56) References Cited

U.S. PATENT DOCUMENTS

| | | | |
|---|---|---|---|
| 6,603,555 | B1 | 8/2003 | Nanami et al. |
| 6,639,678 | B1 | 10/2003 | Veale |
| 9,304,079 | B2 | 4/2016 | Killich |
| 10,307,090 | B2 * | 6/2019 | Rudmann .......... G01N 21/3504 |
| 2005/0286054 | A1 | 12/2005 | Chen et al. |
| 2007/0097371 | A1 | 5/2007 | Parker |
| 2007/0134748 | A1 | 6/2007 | Kudo et al. |
| 2012/0281221 | A1 | 11/2012 | Studer et al. |
| 2012/0287198 | A1 | 11/2012 | Barss |
| 2013/0224872 | A1 * | 8/2013 | Brantley ............ G01N 21/3504 |
| | | | 436/117 |
| 2014/0291526 | A1 | 10/2014 | Killich |

FOREIGN PATENT DOCUMENTS

| | | |
|---|---|---|
| CN | 202590092 U | 12/2012 |
| CN | 104220864 A | 12/2014 |
| EP | 2520924 A1 | 11/2012 |
| JP | S51121379 A | 10/1976 |
| JP | 2000206035 A | 7/2000 |
| JP | 2007263776 A | 10/2007 |
| JP | 2009150827 A | 7/2009 |
| JP | 2014169912 A | 9/2014 |
| JP | 2014522481 A | 9/2014 |

OTHER PUBLICATIONS

Written Opinion (PCT/ISA/237) dated Jul. 24, 2018, by the European Patent Office as the International Searching Authority for International Application No. PCT/EP2018/061461.

F. Venturini et al., "Characterization of strongly scattering nanoporous materials as miniaturized multipass cell for tunable diode laser absorption spectroscopy", Applied Physics B, Apr. 10, 2017, vol. 123, No. 136 (8 pages).

T. Svensson et al., "Pore size assessment based on wall collision broadening of spectral lines of confined gas: experiments on strongly scattering nanoporous ceramics with fine-tuned pore sizes", Applied Physics B, Apr. 21, 2012, vol. 110, pp. 147-154.

T. Svensson et al., "Disordered, strongly, scattering porous materials as miniature multipass gas cells", Physical Review Letters, Sep. 2011. (6 pages).

T. Svensson et al., "Laser spectroscopy of gas confined in nanoporous materials", Applied Physics Letters, Lund University, 2010, vol. 96, No. 2 (56 pages).

M. Lewander, "Laser Absorption Spectroscopy of Gas In Scattering Media", Division of Atomic Physics, Lund University, Lund Report on Atomic Physics, 2010. (98 pages).

J. Larsson, "Development of a compact multipass oxygen sensor used for gas diffusion studies in opaque media", Applied Optics, Nov. 20, 2015, vol. 54, No. 33, pp. 9772-9778.

Office Action dated Oct. 15, 2021, by the European Patent Office in corresponding European Patent Application No. 18722967 9. (13 pages).

English Translation of the Office Action dated Oct. 15, 2021, by the European Patent Office in corresponding European Patent Application No. 18722967.9. (3 pages).

First Office Action dated Jan. 6, 2022, by the Chinese Patent Office in corresponding Chinese Patent Application No. 201880031033.9, and an English Translation of the Office Action. (21 pages).

Office Action dated Jan. 26, 2022, by the Japanese Patent Office in corresponding Japanese Patent Application No. 2019-561811, and an English Translation of the Office Action. (8 pages).

* cited by examiner

GAS MEASUREMENT SYSTEM

RELATED APPLICATION

This application claims priority as a continuation application under 35 U.S.C. § 120 to PCT/EP2018/061461, which was filed as an International Application on May 4, 2018 designating the U.S., and which claims priority to European Application 17170667.4 filed in Europe on May 11, 2017. The entire contents of these applications are hereby incorporated by reference in their entireties.

FIELD

The present disclosure relates to a gas measurement system with a gas cell. The gas measurement system is used for absorption-spectroscopic determination of at least one chemical and/or physical parameter of a gaseous measuring medium.

BACKGROUND INFORMATION

The absorption spectroscopy and particularly the so-called diode laser absorption-spectroscopy by means of a tunable laser, also characterized as TDLAS (tunable diode laser absorption spectroscopy), makes it possible to analyze the specific absorption of a gas such as, for example, oxygen (O2), carbon dioxide (CO2), carbon monoxide (CO), nitrogen oxides (NOx), methane (CH4), amines, ammonia (NH3), hydrogen sulfides (H2S), sulfur oxides (SO2), halogen hydrogen compounds, such as HCl or HF, water and/or moisture (H2O), or even mixtures thereof, and thereby to determine the concentration of said gas in a measuring medium. The areas of application for oxygen measurement systems range, for example, from simple applications in the area of emissions monitoring to complex process controls in the area of chemistry and petrochemistry. Further exemplary areas of application include the control of combustion processes in energy generation and waste incineration.

Measurements can be conducted in a transmission arrangement, wherein measurements in a transflectance arrangement are also known. The beam emitted by a coherent light source, such as a laser or diode laser, is directed by the measuring medium and, after interaction with same, detected by a suitable detector.

The detection sensitivity of such measurements depends on the absorption path according to the Beer-Lambert law, that is the optical path length of the light in the gas to be analyzed. According to this, a longer absorption path is necessary to determine smaller concentrations.

In the case of TDLAS, the beam of a tunable laser passes through the measuring medium. The wavelength of the beam in this case is varied periodically within a predefined wavelength range, wherein the wavelength range traversed by the laser can include one or more absorption bands of the gas to be analyzed. The wavelength range covered is determined by the laser used, more precisely by the diode laser used. A plurality of lasers and diode lasers are known. So-called DFB lasers (distributed feedback lasers) may cover wavelength ranges between about 700 nm and about 3 μm. So-called VCSEL lasers (vertical-cavity surface-emitting lasers) may cover wavelength ranges up to about 2.1 μm, QCL lasers (quantum cascade lasers) may cover wavelength ranges above about 3.5 μm or even above about 4.3 μm, and ICL lasers (interband cascade lasers) may cover wavelength ranges of about 3 μm to 6 μm.

The use of porous ceramic materials as part of the gas cell, such as of microporous or nanoporous ceramics, represents an approach for extending the optical path length for measuring small or low concentrations. However, it has already been shown that the use of such materials in the beam path leads to undesirable interference effects, so-called speckle formation on the detector, due to the scattering on precisely this porous material, which leads to a signal with a very strong noise level in the dynamic situation of wavelength scans.

T. Svensson, et al. Phys. Rev. Lett. 107, 143901 (2011) describes studies on the interaction of light and gas in strongly scattering nanoporous and microporous materials such as, in particular, sintered ceramics with different pore sizes comprising titanium dioxide (TiO2), zirconium dioxide (ZrO2), or aluminum dioxide (Al2O3). It has been shown that light from such porous ceramics is randomly scattered or micro-scattered and thereby the optical path length is greatly extended proportional to the actual thickness of the transmitting ceramic material. It was additionally shown that these materials are generally suitable as a miniaturized multi-pass gas cell for the TDLAS determination of oxygen at 760 nm, wherein titanium dioxide has been found to be less suitable due to a strong absorption band at 760 nm.

Optical interference noise, which can be suppressed, for example, by laser beam dithering, which described in greater detail by T. Svensson et al., Opt. Lett. 33 (1), 80 (2008), represents a known limitation of the spectroscopic analysis. To that end, the sample can be rotated and/or tracking coils can be used, which comprise a lens, which is arranged close to two coils, and thereby enable an adaptation of the lens position.

J. Larsson, et al. Appl. Optics 54 (33), 9772 (2015) likewise describes strongly scattering porous ceramics as a multi-pass cell in a TDLAS arrangement in order to determine oxygen in wood as an optically opaque medium at 760 nm by wavelength-modulated spectroscopy, wherein wavelength modulation is used to improve the sensitivity of the measurement system through noise suppression. A piece of ceramic material of about 5 mm thickness was placed in the wood to be analyzed and the laser light scattered in the material was detected, which was coupled into the material via a first optical fiber and coupled back out via a second optical fiber. In this experiment, the harmful optical interference was suppressed in that the optical components were moved by means of small motors.

CN 102 621 063 B discloses a gas measurement system with a gas cell of porous aluminum oxide, wherein, in order to suppress interference noise, a collimator is used to optimize the laser beam, which is directed through a fiber coupled to the gas cell.

CN 202 590 092 A discloses a gas measurement system with a laser and a gas cell with a core of porous material, wherein the detector for the scattered laser light is arranged on a three-dimensional translation stage such that the detector can be moved in order to adjust and/or record the desired optical path length.

The known options for suppressing interference noise are not useable in commercial gas measurement systems in a process environment, because movement of the optical components of the measurement system is mechanically complex; much space as well as a complex electronic actuation are required, whereby such gas measurement systems are large and/or subject to extensive maintenance.

SUMMARY

A gas measurement system is disclosed, comprising: a coherent light source configured to emit a light beam; a detector; a beam path formed between the light source and the detector; a gas cell arranged in the beam path between the light source and the detector such that the detector will receive light transmitted through the gas cell; and an optical element arranged in the beam path between the light source and the gas cell; wherein the gas cell includes a porous ceramic; wherein the gas cell has an optical path length which is a multiple of an actual layer thickness of the gas cell; and wherein the optical element is configured: i. as an optically transparent window such that widening of a light beam will occur based on divergence of the light beam; or ii. to include a diffuser or at least one diffractive optical element to deform a light beam; such that when a light beam is emitted by the light source it will be widened and unfocused when entering the gas cell.

Method for absorption-spectroscopic determination of content of one or more gases, the method comprising: emitting a light beam along a beam path between a light source and a detector, the beam path including a gas cell and an optical element, the gas cell having a porous ceramic and having an optical path length which is a multiple of an actual layer thickness of the gas cell; and determining content of one or more of the following gases using the detector: oxygen ($O_2$), carbon dioxide ($CO_2$), carbon monoxide (CO), nitrogen oxides (NOx), methane ($CH_4$), amines, ammonia ($NH_3$), hydrogen sulfides ($H_2S$), sulfur oxides ($SO_2$), hydrogen halides, HCl or HF, water and/or moisture ($H_2O$), or mixtures thereof.

BRIEF DESCRIPTION OF THE DRAWINGS

Various embodiments of a gas measurement system according to the present disclosure are described in the following detailed description by way of the figures. The figures show the following.

DETAILED DESCRIPTION

Figure 1:
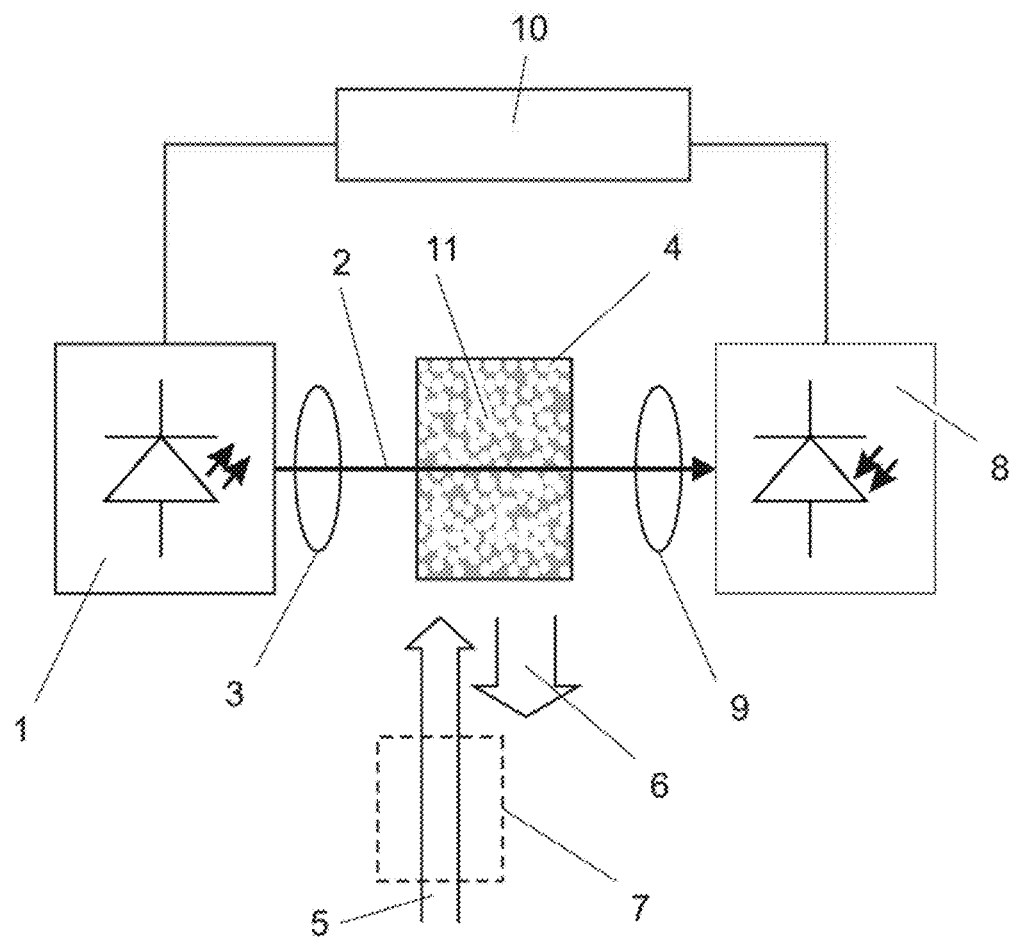
FIG. 1 shows an exemplary schematic representation of a gas measurement system, according to an exemplary embodiment of the present disclosure, in transmission.

A robust gas measurement system with a compact gas cell is disclosed, which can include a porous ceramic and which has an improved signal-to-noise ratio.

An exemplary gas measurement system according to the present disclosure, includes a coherent light source, which emits a light beam; a detector; a beam path, which is formed between the light source and the detector; and a gas cell, which is arranged in the beam path between the light source and the detector, such that the detector receives the light transmitted through the gas cell. The gas cell can include a porous ceramic material and has an optical path length which is a multiple of the actual layer thickness of the gas cell. Furthermore, an optical element is arranged in the beam path between the light source and the gas cell, and the light beam emitted by the light source is widened and unfocussed as the light beam enters the gas cell. The optical element is either an optically transparent window, wherein the widening of the light beam takes place based on the divergence of the light beam, or the optical element includes a diffuser or at least one diffractive optical element, which deforms the light beam such that the light beam emitted by the light source is widened and unfocused as the light beam enters the gas cell.

Due to the use of a porous ceramic in the gas cell, the light entering the gas cell, more precisely the porous ceramic, is reflected multiple times or randomly scattered within the ceramic before it then exits the ceramic, which results in an optical path length, which is a multiple of the actual layer thickness of the gas cell and for example of the layer thickness of the porous ceramic.

As previously described, the use of such porous ceramics leads to undesirable interference and speckle formation. This is suppressed in the gas measurement system according to exemplary embodiments in that the light beam emitted by the light source is widened and unfocused as the light beam enters the gas cell, whereby the interferences that occur cancel each other out and can be filtered from the measuring signal.

For example, the phase of the light wave and/or the light beam emitted by the light source is as mixed as possible. Under the assumption of a Gaussian beam, this would mean that the wavefronts, which are further away from the beam waist, are more strongly curved.

Optical path lengths which are at least 10 times and for example at least about 50 times larger and/or longer than the actual layer thickness of the gas cell are implementable. Under exemplary optimum conditions, even optical path lengths of up to several hundred times longer than the actual layer thickness can be implemented. The term "actual layer thickness of the gas cell" is understood to be the thickness of the gas cell, which corresponds to the path that would be traveled through the gas cell without random scattering in the porous ceramic.

The extreme extension of the optical path length at first enables the construction of a very small, compact gas measurement system. A correspondingly small exemplary gas cell additionally has the advantage that very quick gas exchange times can be realized due to the small sample volume and thus also quick concentration changes can be reliably detected and analyzed in the gas to be analyzed.

In an exemplary embodiment, the optical element is an optically transparent window, such as a process window. The optically transparent window is primarily used to separate the gas cell from the other optical components such as, in particular, the light source and the detector and to prevent, for example, the gas to be measured from the gas cell from penetrating the other components of the gas measurement system. This can be particularly important when only the "natural" divergence of the light beam is being used to widen the light beam.

In a further exemplary embodiment, the optical element deforms the light beam, wherein the optical element includes a diffuser or a diffractive optical element or a combination of diffractive elements. An optical element designed and configured in this manner actively acts on the light beam and is used to widen it such that a widened and unfocused light beam can enter the gas cell. Such a beam widening can be achieved, for example, through the use of a cylindrical lens, a cylindrical lens in combination with an aperture, a lens array, or a Powell lens. Instead of a diffractive optical element, a refractive optical element can also be used for the beam widening.

The use of an optical element or the natural divergence of the light beam to widen the light beam can be especially advantageous, because, in this manner, the use of mechanically moving components and/or complex electronic actuations can be avoided, which enables the construction of small and compact gas measurement systems.

In a further exemplary embodiment, the optical element, which deforms the light beam, may additionally act as a process window. This exemplary embodiment has particular advantages when an exemplary gas measurement system according to the present disclosure is designed and configured as especially small and compact, because the optical element can be used for both the beam deformation and to separate out the gas cell.

The gas measurement system can additionally include a further optical element, which is arranged in the beam path between the gas cell and the detector and comprises an optical window or a reflector. Depending on the design and configured of the gas measurement system, the further optical element is used to spatially separate the detector from the gas cell; this can be primarily relevant with a transmission arrangement; or the further optical element functions as a reflector and enables the light beam to be reflected back to the gas cell after exiting the gas cell and is only directed to the detector after passing through the gas cell again, which is also characterized as a transflectance arrangement.

The coherent light source of the gas measurement system is for example a laser and particularly a tunable laser. For the determination of oxygen, a laser is suitable which emits or can be varied, for example, in a range of for example 760 nm, and for the determination of NH3, a laser is suitable which emits or can be modulated in a range of around, for example, 1500 nm, because a strong absorption band of oxygen or NH3 is in these ranges.

The detector can be designed and configured as a photodetector, for example as a thermopile detector, bolometer, pyroelectric detector, photomultiplier, photodiode, or photoresistor. The selection of the detector in this case is determined for example, by the wavelength of the beam to be detected and/or of the light to be detected.

In a further exemplary embodiment, the gas measurement system according to the disclosure can further have a sample preparation unit upstream of the gas cell. In this manner, it is possible, for example, to remove harmful contaminants from the measuring medium and/or to remove a sample from a container or a process environment and subsequently measure it.

The gas measurement system is for example NeSSI-compatible. NeSSI stands for New Sampling/Sensor Initiative—an initiative of the University of Washington, in Seattle, which enables the modular setup of sampling and/or measurement systems in small or even the smallest of spaces due to the standardization of sealing and coupling systems with corresponding valves, pressure reducers, filters, and further components.

The porous ceramic used in the gas cell is for example nanoporous or microporous. The optimum pore size of the ceramic in this case should, for example, be determined experimentally and depends on both the wavelength used, and thus on the gas to be analyzed, as well as on the ceramic material used.

The porous ceramic includes, for example, zirconium oxide, aluminum oxide, titanium oxide, silicon oxide, magnesium oxide, yttrium oxide, gallium phosphide, porous silicon, or mixtures thereof.

Depending on the design and configuration of the gas measurement system, it can be used to determine the content of one or more of the following gases: oxygen (O2), carbon dioxide (CO2), carbon monoxide (CO), nitrogen oxides (NOx), methane (CH4), amines, ammonia (NH3), hydrogen sulfides (H2S), sulfur oxides (SO2), halogen hydrogen compounds, such as HCl or HF, water and/or moisture (H2O), or mixtures thereof.

FIG. 1 shows an exemplary schematic representation of a gas measurement system according to the disclosure in transmission. The gas measurement system can include a coherent light source 1, which emits light or a beam along a beam path 2 indicated by an arrow. Lasers, diode lasers, and for example, tunable diode lasers can be used as the coherent light source, wherein the wavelength of the beamed light is selected by the gas to be determined. To determine oxygen, particularly a coherent light source 1, for example, with an exemplary wavelength of 760 nm can be used.

The light of the light source 1 is directed to a gas cell 4, which can include a porous ceramic 11, by means of an optical element 3. The porous ceramic 11 is for example, a microporous or nanoporous ceramic 11, which can include zirconium oxide, aluminum oxide, titanium oxide, silicates, magnesium oxide, yttrium oxide, gallium phosphide, porous silicon, or mixtures thereof. The pore sizes of the porous ceramic 11 in this case are selected as a function of the utilized wavelength of the coherent light source and are for example, between about (e.g., ±10%) 20 nm and about 5 μm. For applications with wavelengths in the MIR (mid-infrared) range, ceramics with pore sizes of up to about 10 μm can be used. For the determination of oxygen at 760 nm, for example, zirconium dioxide with a pore size of about 100 nm is suitable.

The light beam striking the gas cell 4 or entering the gas cell 4 is for example unfocused and widened such that the porous ceramic 11 is flat and only illuminated at points, as with a focused beam. It has been shown experimentally that a beam diameter of about 4 mm effects sufficient interference suppression when using a disk-shaped ceramic 11 with a diameter of about 18 mm.

The beam widening can be achieved over a certain distance merely by way of the "natural" divergence of the light exiting the light source 1. In this case, the optical element 3 may be formed as an optically opaque window or process window without specific imaging properties and thus can be used primarily to separate the light source from the sample and/or the measuring medium. Furthermore, the optical element may be designed and configured as a diffuser or diffractive optical element. These elements can, for example, function simultaneously as an optically opaque window, or they can be used together with an additional process window.

As shown here, the gas cell 4 can include connections 5, 6 for introducing or expelling a gas sample to be analyzed. The sample may be, for example, a gaseous measuring medium or even a sample separated from the measuring medium. The gaseous sample can be placed in the gas cell 4 directly or via a sample removal or sample preparation system 7, as indicated here. Different sample removal or sample preparation systems are known, with which a gaseous sample can be removed from a measuring medium or a process environment and also prepared depending on the design and configuration.

The light in the gas cell 4 interacts with a sample contained therein and is directed to a suitable detector 8 after exiting the gas cell 4. To this end, a further optical element 9 may be arranged in the beam path, between the gas cell 4 and detector 8, as shown by example here. In a gas measurement system in transmission, collection optics, for example, which focus the light exiting the gas cell 4 onto the detector 8, may be used as a further optical element 9. In an especially compact gas measurement system, the further optical element may additionally serve as a process window and thus physically separate the sample from the detector 8. The detector 8 and also the coherent light source 1 are connected to a suitable control and/or regulation unit 10, which can also include an evaluation unit.

Figure 2:
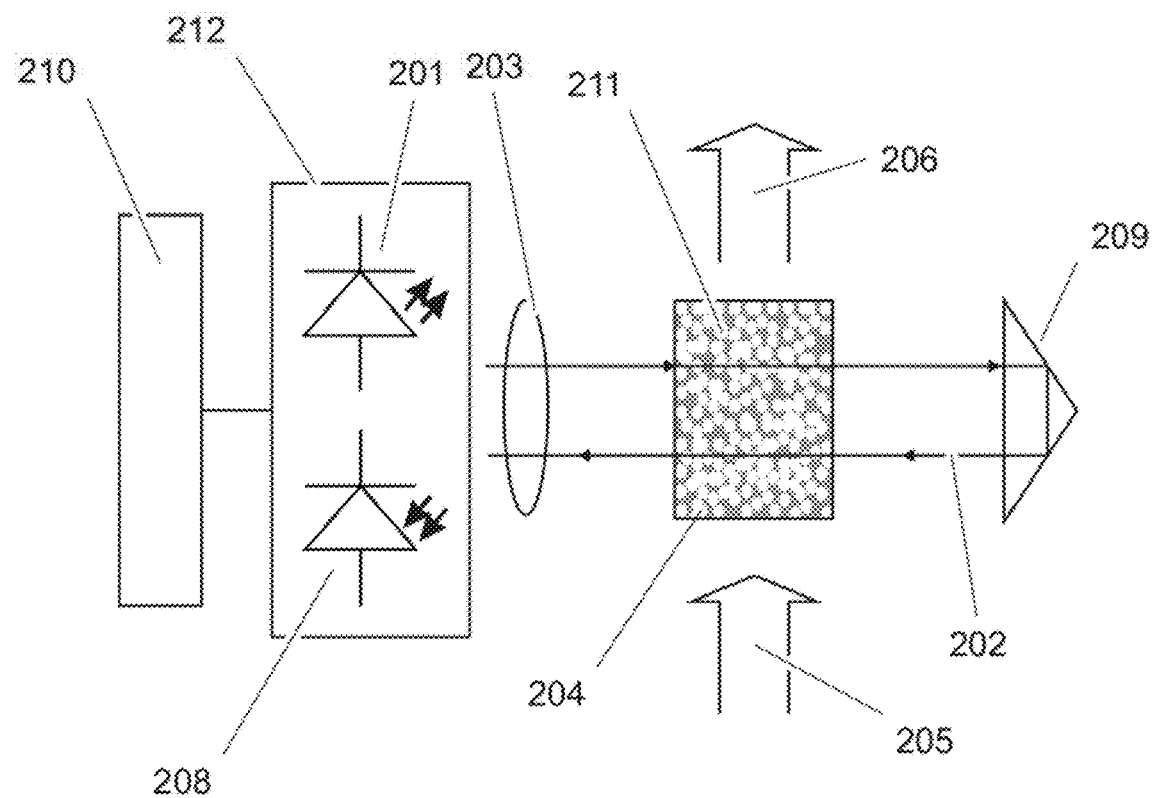
FIG. 2 shows an exemplary schematic representation of a gas measurement system, according to an exemplary embodiment of the present disclosure, in transflectance.

FIG. 2 schematically shows a gas measurement system according to an exemplary embodiment disclosed herein in transflectance, in which the coherent light source 201 and the detector 208 are arranged in a common housing 212 and are connected with a suitable control and/or regulation unit 210. A light beam emitted by the light source 201, the beam path 202 of the light beam being indicated here by an arrow, is directed to a gas cell 204, which can include a porous ceramic 211, by means of an optical element 203, which preferably, for example, simultaneously serves as a process window. The gas to be analyzed can be introduced to the gas cell 204 and then again removed by means of suitable inlets and outlets 205, 206. In the exemplary embodiment shown here by example, the gas sample is directed through the gas cell 204. After passing through the ceramic 211 and/or the gas cell 204, the exiting light is again directed back through the gas cell 205 and the optical element 203 by means of a further optical element 209, which is designed and configured as a reflector here.

Figure 3:
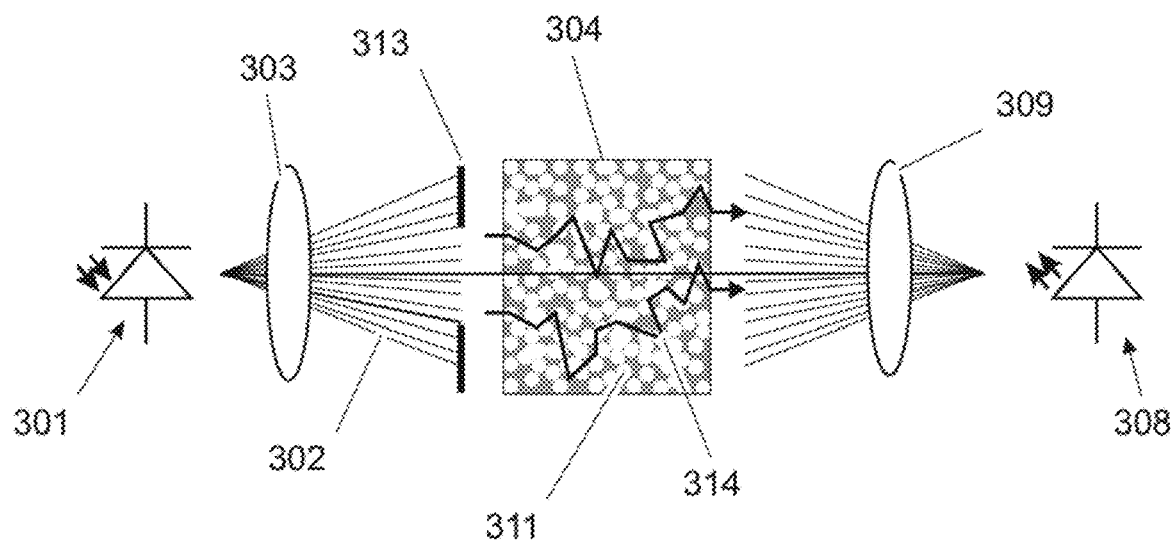
FIG. 3 shows an exemplary schematic representation of the optical beam path.

FIG. 3 shows, by example and schematically, the optical beam path of a gas measurement system according to an exemplary embodiment disclosed herein; only the beam path in transmission is shown for a better overview. Starting from a coherent light source 301, a light beam 302 is emitted, which is directed to a detector 308 by means of an optical element 303, a gas cell, and a further optical element 309. The emitted light beam 302 widens until striking the gas cell 304, more precisely the porous ceramic 311 contained therein, such that the gas cell is illuminated with diffuse laser light. It was shown experimentally that the harmful interference, particularly the speckle formation, was greatly suppressed due to the widening of the light and/or laser beam, and the signal-to-noise ratio was significantly improved, as is shown by example in FIG. 5 for the measurement of an oxygen absorption line.

The gas measurement system, as shown here, can additionally have an aperture 313, which is arranged in the beam path 302, between the optical element 303 and the gas cell 304. If an iris aperture is used, it is additionally possible to change the diameter of the light beam and thus change the intensity of the light entering the gas cell 304.

The porous ceramic 311 has an actual layer thickness of for example, about 5 mm to 10 mm; however, due to the diffuse reflection on the nanoparticles or microparticles present in the ceramic, the effective optical path 314 that the light travels is extended many times over, as is indicated by the arrow. The optical path length of the gas cell 304 is thus many times longer than its actual layer thickness.

The light exiting the gas cell is directed to the detector 8 by means of the further optical element 309. The design and configuration of the further optical element 309 was described in connection with FIG. 1 for a transmission arrangement and in connection with FIG. 2 for a transflectance arrangement.

The different options already described in connection with FIGS. 1 and 2 can be used as the optical element 3, 203, 303 and gas cell 4, 304, 404. Furthermore, the light beam along the beam path 2, 202, 302 can be guided between the light source 1, 201, 301 and gas cell 4, 204, 304 and/or between the gas cell 4, 204, 34 and detector 8, 208, 308, wholly or partially in light conductors.

Figure 4:
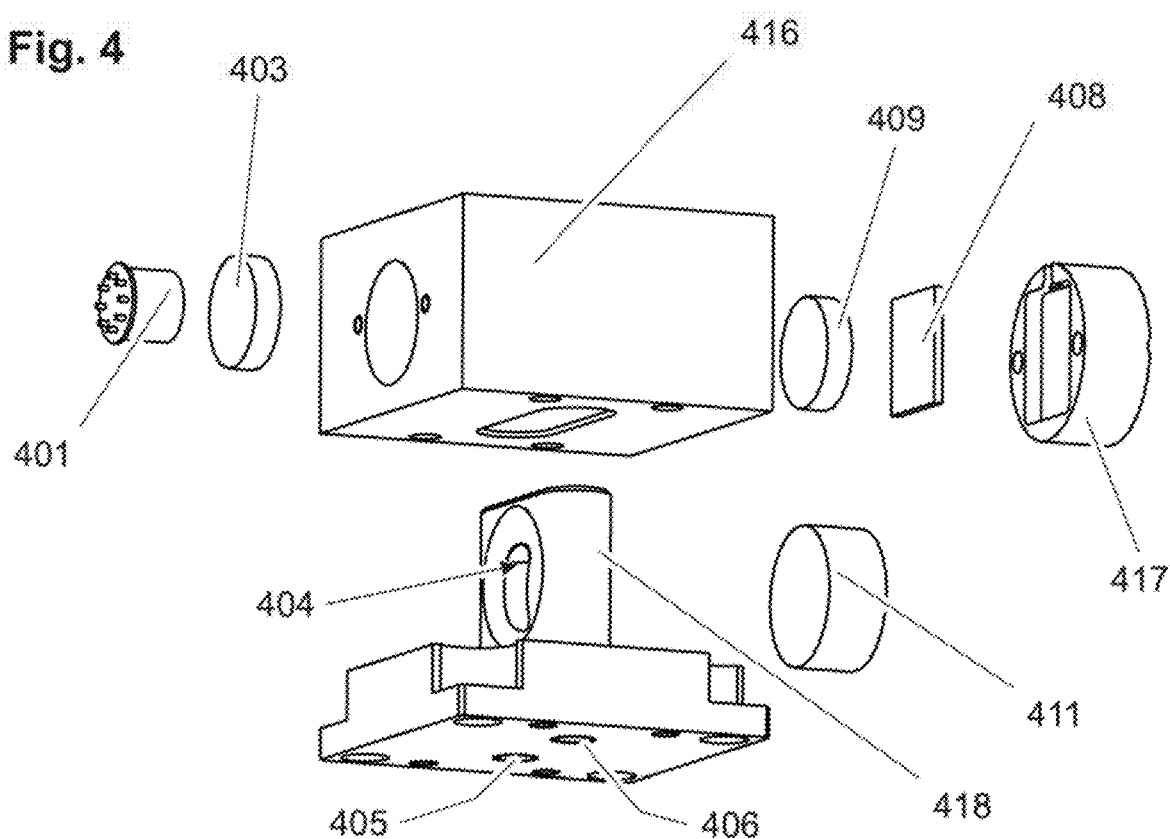
FIG. 4 shows an exemplary exploded view of a gas measurement system, according to an exemplary embodiment of the present disclosure, in transmission, which is NeSSI-compatible.
Figure 5:
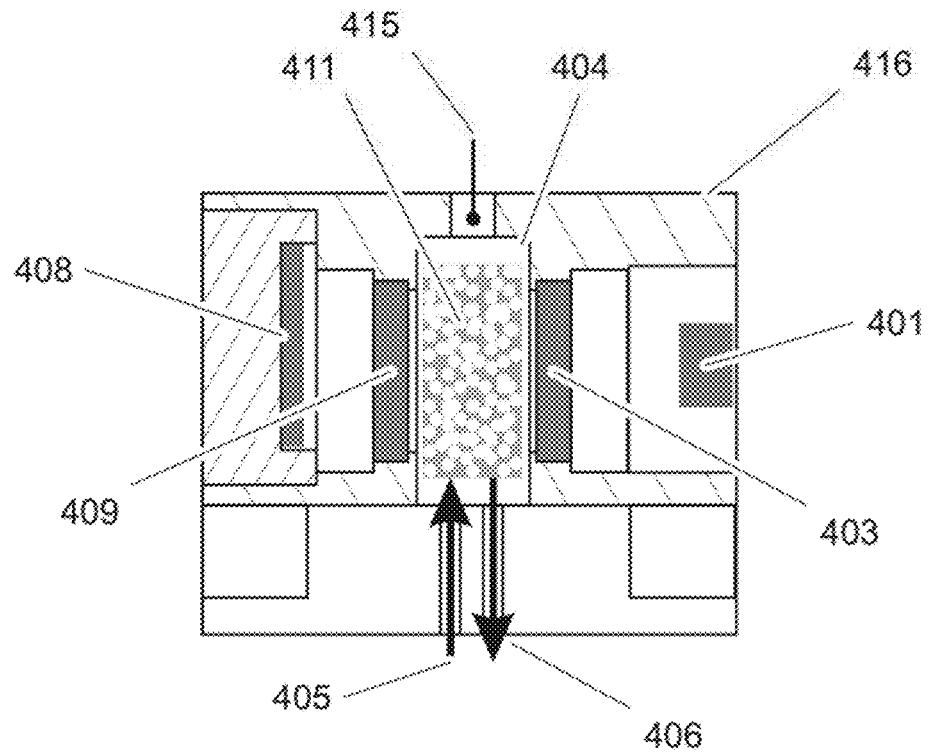
FIG. 5 shows an exemplary schematic representation of the compact gas measurement system from FIG. 4 in a sectional view.

FIGS. 4 and 5 show a sectional view of a gas measurement system according to an exemplary embodiment as disclosed herein, which is NeSSI-compatible. FIG. 4 shows the gas measurement system according to an exemplary embodiment as disclosed herein in a sectional view, and FIG. 5 is a three-dimensional representation.

Light from a coherent light source 401, such as a VCSEL laser for example, is directed through a gas cell 404 with a porous ceramic 411 by means of an optical element 403, which serves as a process window and is used to widen the light beam, wherein the porous ceramic 411 is illuminated with a widened light beam. The gas cell 404 additionally can have gas connections 405, 406, by means of which a gas to be analyzed can be introduced into the gas cell 404 and then again removed. The gas to be analyzed can be introduced directly into the gas cell 404 or, as previously shown in FIG. 1, directed by means of a sample removal system 7 beforehand. Furthermore, the gas measurement system has at least one measuring sensor 415, with which, for example, the temperature and/or the pressure in the gas cell 404 can be determined. After transmission through the gas cell 404 and particularly the porous ceramic 411, the light and/or the light beam is directed to a detector 408 by means of a further optical element 409, which also serves as a process window here. The detector 408 is designed and configured, for example, as a photodetector.

The gas measurement system shown in an exploded view and sectional view in FIGS. 4 and 5 is particularly small and compact in design, wherein all optical components are arranged in a housing block 416 in the assembled state. The gas cell 404 with the porous ceramic 411 is designed and configured such that particularly the ceramic 411 can be easily exchanged when it is soiled for example. The gas cell additionally has inlets/outlets 405, 406 for the gas to be analyzed. To this end, the porous ceramic 411 is attached as a disk in a suitable frame 418, as is also known, for example, for the attaching of lenses or optical filters. The coherent light source 401 and/or the detector 408, which is arranged in a bracket 417, can likewise be exchanged; this can be especially advantageous, because different gases with different wavelengths can be measured with the same setup.

The gas measurement system according to an exemplary embodiment as disclosed is for example, NeSSI-compatible. A prototype, as shown in FIGS. 4 and 5, was implemented, for example, as a compact cube with a side length of less than 5 cm. The porous ceramic 411 in this case was designed and configured as a disk made of zirconium oxide with a diameter of about 16 mm, a layer thickness of about 6.4 mm, and a pore size of about 100 nm, whereby an optical path length of up to about 5 m was realized. This corresponds to a practically 800-fold enlargement or extension of the actual layer thickness of the gas cell. The small volume of the gas cell 404, which is given particularly by the dimensions of the porous ceramic 411, additionally has the advantage that a very fast gas exchange can be implemented in the gas cell 404, and thereby quick changes in concentration can be detected in the measuring medium and/or the gas to be analyzed.

NeSSI stands for New Sampling/Sensor Initiative—an initiative of the University of Washington, in Seattle, which enables the modular setup of sampling and/or measurement systems in a small space due to the standardization of sealing and coupling systems with corresponding valves, pressure reducers, filters, and further components.

Figure 6:
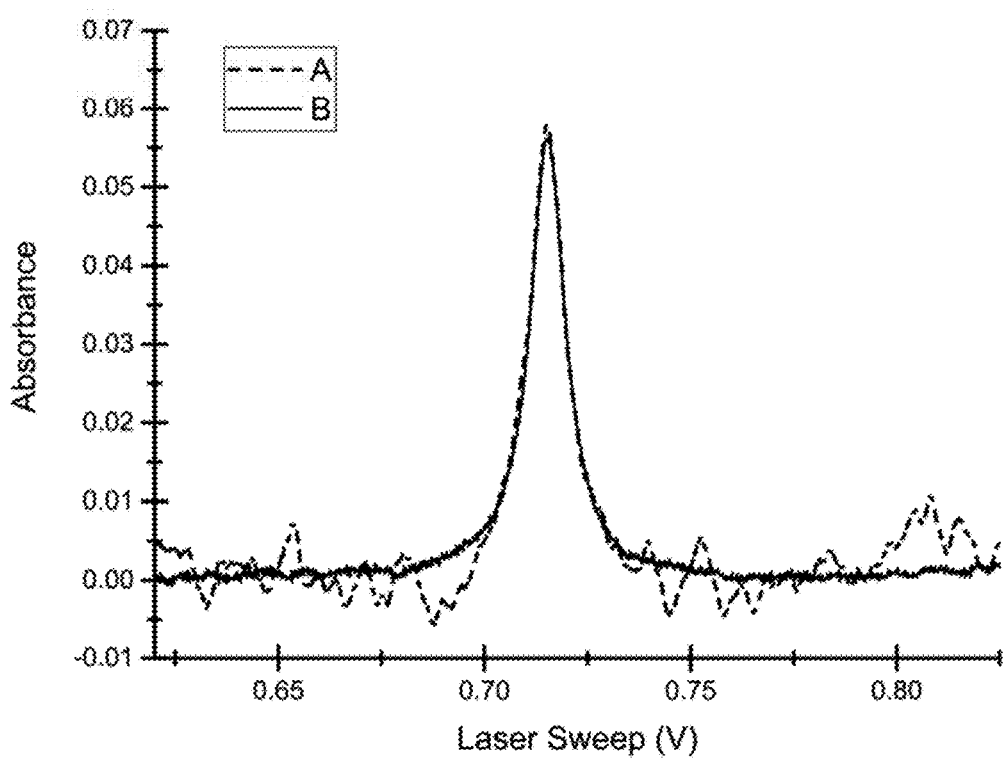
FIG. 6 shows an exemplary comparative measurement of the oxygen absorption line with a light beam focused on the gas cell and/or widened.

In comparison, FIG. 6 shows a measurement of the oxygen absorption line with a light beam focused on the gas cell (line A) or a widened light beam (line B) according to an exemplary embodiment as disclosed herein. A VCSEL laser with a wavelength of 760 nm was used as the coherent light source, a photodetector was used as the detector, and a zirconium dioxide disk with a layer thickness of about 6.4 mm was used as the porous ceramic. The optical path length through the porous ceramic was determined to be about 5 m by calibration in air and thus was practically 800-fold larger than the effective layer thickness. The pore size of the zirconium dioxide ceramic used was about 100 nm. Measurement A was conducted with a laser beam, which was focused to about 70 microns, and measurement B was conducted with a laser beam, which was widened to about a 4.1 mm diameter. It was thereby possible to strongly suppress the interference, particularly the speckle formation, which was shown in a significantly improved signal-to-noise ratio of absorption line B, which absorbed a widened light beam. In addition, a speckle suppression factor of $\sigma_A/\sigma_b=7.9$ was determined, which defines the ratio of noise, with and without speckle formation.

This significant improvement in the signal-to-noise ratio is achieved in the gas measurement system according exemplary embodiments as disclosed herein using purely optical solution and/or passive solution, which requires neither moving elements nor an additional electronic actuation. Thus, the gas measurement system according to the present disclosure can be extremely robust and can also be realized with a small and compact design.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1, 201, 301, 401 Light source
2, 202, 302 Beam path
3, 203, 303, 403 Optical element
4, 204, 304, 404 Gas cell
5, 205, 405 Connection
6, 206, 406 Connection
7 Sample removal or sample preparation system
8, 208, 308, 408 Detector
9, 209, 309, 409 Further optical element
10, 210 Control and/or regulation unit
11, 211, 311, 411 Porous ceramic
212 Housing
313 Aperture
314 Optical path
415 Measuring sensor
416 Housing block
417 Bracket
418 Frame

The invention claimed is:

1. A gas measurement system for absorption-spectroscopic determination of at least one chemical and/or physical parameter of a gaseous measuring medium, comprising:
   a coherent light source configured to emit a light beam;
   a detector;
   a beam path formed between the light source and the detector;
   a gas cell arranged in the beam path between the light source and the detector such that the detector will receive light transmitted through the gas cell; and
   an optical element arranged in the beam path between the light source and the gas cell;
   wherein the gas cell includes a porous ceramic;
   wherein the gas cell has an optical path length which is a multiple of an actual layer thickness of the gas cell; and
   wherein the optical element is configured:
   as an optically transparent window such that widening of a light beam will occur based on divergence of the light beam; or
   to include a diffuser or at least one diffractive optical element to deform a light beam;
   such that when a light beam is emitted by the light source it will be widened and unfocused when entering the gas cell.

2. The gas measurement system according to claim 1, wherein the optical path length is at least 10 times longer than the actual layer thickness of the gas cell.

3. The gas measurement system according to claim 1, wherein the gas cell and/or the porous ceramic are exchangeable.

4. The gas measurement system according to claim 3, comprising:
   a process window.

5. The gas measurement system according to claim 4, comprising:
   a further optical element arranged in the beam path between the gas cell and the detector and having an optical window or a reflector.

6. The gas measurement system according to claim 5, wherein the coherent light source is a laser, or a tunable laser.

7. The gas measurement system according to claim 6, wherein the detector is a photodetector, a thermopile detector, a bolometer, a pyroelectric detector, a photomultiplier, a photodiode, or a photoresistor.

8. The gas measurement system according to claim 7, comprising:
   a sample preparation unit upstream of the gas cell.

9. The gas measurement system according to claim 1, comprising:
   a process window.

10. The gas measurement system according to claim 9, wherein the optical element is configured to function as a process window.

11. The gas measurement system according to claim 1, comprising:
    a further optical element arranged in the beam path between the gas cell and the detector and having an optical window or a reflector.

12. The gas measurement system according to claim 1, wherein the coherent light source is a laser, or a tunable laser.

13. The gas measurement system according to claim 1, wherein the detector is a photodetector, a thermopile detector, a bolometer, a pyroelectric detector, a photomultiplier, a photodiode, or a photoresistor.

14. The gas measurement system according to claim 1, comprising:
    a sample preparation unit upstream of the gas cell.

15. The gas measurement system according to claim 1, configured to be NeSSI-compatible.

16. The gas measurement system according to claim 1, wherein the porous ceramic is nanoporous or microporous.

17. The gas measurement system according to claim 1, wherein the porous ceramic comprises:
    zirconium oxide, aluminum oxide, titanium oxide, silicon oxide, magnesium oxide, yttrium oxide, gallium phosphide, porous silicon, or mixtures thereof.

18. The gas measurement system according to claim 1, wherein the optical path length is at least 50 times longer than the actual layer thickness of the gas cell.

19. The gas measurement system according to claim 1, wherein the optical path length is at least several hundred times longer than the actual layer thickness of the gas cell.

20. Method for absorption-spectroscopic determination of content of one or more gases, the method comprising:
    emitting a light beam along a beam path between a light source and a detector, the beam path including a gas cell and an optical element, the gas cell having a porous ceramic and having an optical path length which is a multiple of an actual layer thickness of the gas cell;
    widening and unfocusing the light beam emitted by the light source before it enters the gas cell using an optical element arranged in the beam path between the light source and the gas cell; and
    determining content of one or more of the following gases using the detector:
    oxygen ($O_2$), carbon dioxide ($CO_2$), carbon monoxide (CO), nitrogen oxides (NOx), methane ($CH_4$), amines, ammonia ($NH_3$), hydrogen sulfides ($H_2S$), sulfur oxides ($SO_2$), hydrogen halides, HCl or HF, water and/or moisture ($H_2O$), or mixtures thereof.

* * * * *